United States Patent [19]

Garzon

[11] 4,209,814

[45] Jun. 24, 1980

[54] SYNCHRONOUS CIRCUIT BREAKER

[75] Inventor: Ruben D. Garzon, Malvern, Pa.

[73] Assignee: Gould Inc., Rolling Meadows, Ill.

[21] Appl. No.: 843,575

[22] Filed: Oct. 19, 1977

[51] Int. Cl.[2] .................... H02H 7/22

[52] U.S. Cl. .................... 361/5; 361/8; 361/13; 307/134

[58] Field of Search .................... 361/5, 13, 6, 7, 8, 361/9, 2, 3; 335/19; 307/134, 135, 137, 138, 125, 127, 130, 252 VA; 200/144 R, 144 B, 144 AP

[56] References Cited

U.S. PATENT DOCUMENTS

| | | | |
|---|---|---|---|
| Re. 29,172 | 4/1977 | Lutz | 361/13 X |
| 2,675,505 | 4/1954 | Flurscheim et al. | 361/13 X |
| 2,748,226 | 5/1956 | MacNeill et al. | 361/13 X |
| 3,223,888 | 12/1965 | Koppelmann | 361/3 X |
| 3,284,648 | 11/1966 | Koppelmann | 361/3 |
| 3,395,316 | 7/1968 | Denes et al. | 361/13 X |
| 3,402,324 | 9/1968 | Kesselring et al. | 361/5 |
| 3,491,315 | 1/1970 | Kesselring | 335/19 |
| 3,636,292 | 1/1972 | Roth | 361/13 X |
| 3,864,604 | 2/1975 | Pfanzelt | 361/6 |

*Primary Examiner*—Patrick R. Salce

*Attorney, Agent, or Firm*—Ostrolenk, Faber, Gerb & Soffen

[57] ABSTRACT

A high power a-c circuit breaker having substantially no arcing during interruption consists of two identical switching circuits in series which each include a main high speed switch connected in parallel with a series-connected diode and high speed isolating switch. The diodes of each of the switching circuits oppose one another in polarity. Current flow through the circuit breaker is normally through the closed main high speed switches. A polarity-sensitive operating circuit is provided to open the appropriate high speed switch just before a current zero and to transfer forward current through its related diode. This diode blocks a current reversal, and the associated series-connected isolating switch is opened just after current is commutated into the diode, and at or before the current zero time is reached and while the diode is blocking. Voltage distributing capacitors and non-linear resistors are connected in parallel with and distribute the voltage between the series-connected isolator switches and diode. A single one of the two identical switching circuits can be used for application to d-c circuits or for discharge currents having a single polarity.

1 Claim, 5 Drawing Figures

SYNCHRONOUS CIRCUIT BREAKER

BACKGROUND OF THE INVENTION

This invention relates to high power circuit interrupters, and more specifically relates to a novel circuit interrupter which operates with substantially no arcing.

Circuit interrupters which can operate without substantial arcing are well known, and generally are synchronous circuit breakers in which the circuit interrupter contacts are separated just prior to a current zero value of the current to be interrupted. These devices are complex and expensive and require precise timing for their operation.

Other circuit interrupters are known which use solid state components for their operation, but the solid state components are very large and must be capable of carrying large bursts of energy.

BRIEF DESCRIPTION OF THE INVENTION

The present invention provides a novel combined arrangement of relatively small solid state devices with high speed but simple switches to obtain substantially arcless interruption.

More specifically, for a-c circuit interruption, two identical series-connected circuits are provided which operate to interrupt current of one or the other polarity, respectively. Each circuit includes a main high speed switch having substantially no interrupting capacity for normally carrying the main circuit current. A respective series-connected diode and isolating switch are connected in parallel with each main switch. A polarity monitor circuit and current zero anticipator circuit then, on appropriate command, open the appropriate main switch slightly before (e.g. 100 microseconds) a current zero to commutate forward current into its parallel-connected diode. When the current goes through zero, the diode blocks current flow, and the isolating switch in series with the diode is opened just before the current zero is reached to fully open the circuit and to remove full recovery voltage from the diode as it beings to block. Auxiliary isolating swithces may also be opened at a later time to fully isolate the circuit interrupter.

Suitable voltage division means is also provided across the series-circuit elements, and these may include positive temperature coefficient resistors.

The novel circuit does not require exact synchronization as long as the main switch is operated some short but uncritical time prior to current zero, and the isolating switch should operate some uncritical time after its associated diode begins to block. The diode itself can be small in size and of a commercially available type since it carries current for only a short time prior to current zero, and it is subject to the circuit recovery voltage for only a short time until its isolating switch is opened. Thus, mechanical switches are used to serve as bypass elements to carry high continuous current, while second switch means are provided to withstand high reverse voltages. The above operation takes place with practically no arcing so that contact life is increased. Moreover, the invention permits a decrease in the size of the contacts and the size of the circuit breaker.

A single circuit of the above type, without polarity detection, can be used for application to d-c type circuits.

DETAILED DESCRIPTION OF THE DRAWINGS

Figure 1:
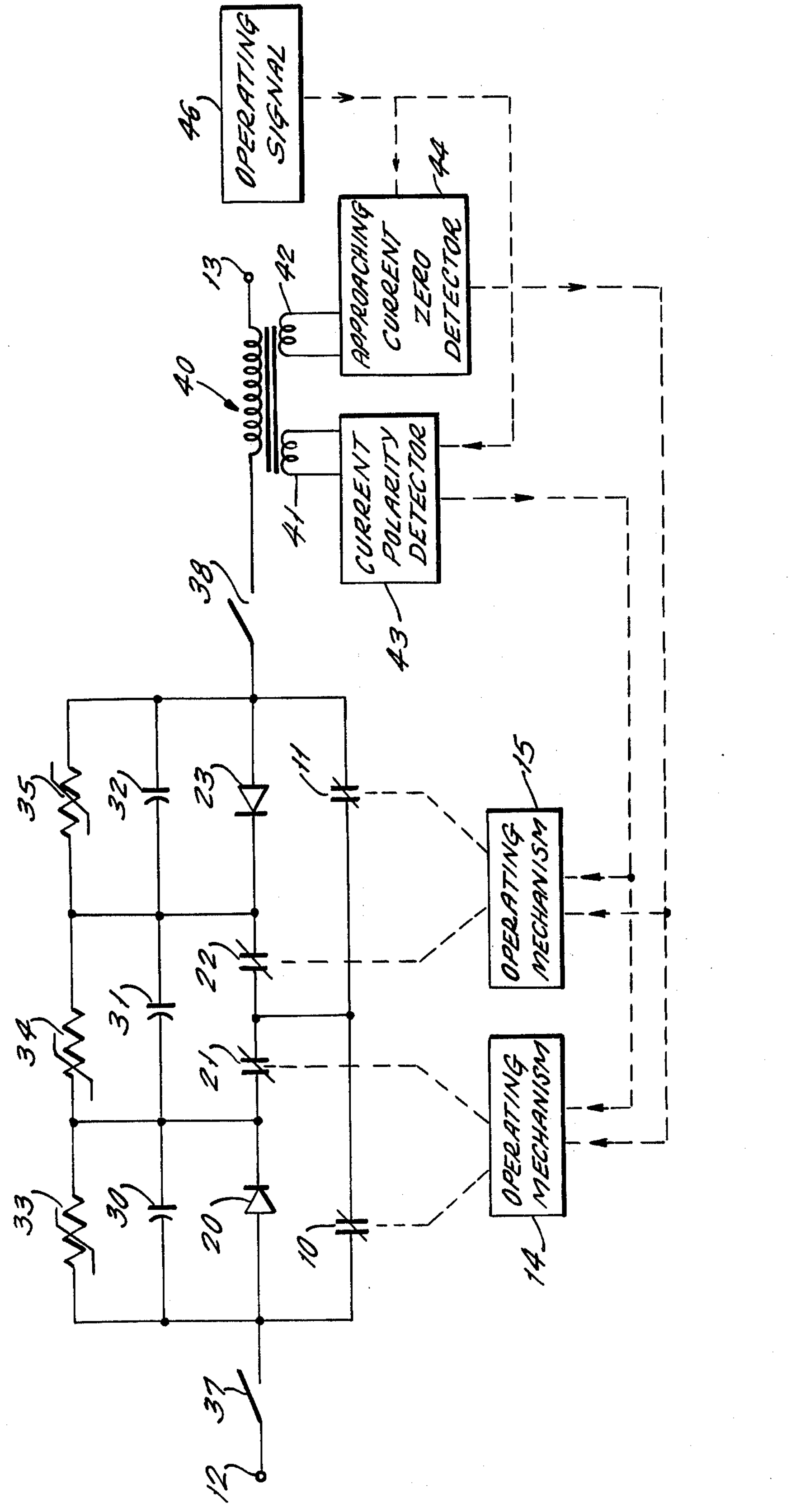
FIG. 1 is a circuit diagram of the diode and switch arrangement of the present invention.

Referring first to FIG. 1, there is shown an interrupter for a single phase of a power system in which a pair of identical high speed switches 10 and 11 are connected to carry the main current of the line shown between terminals 12 and 13. Each of switches 10 and 11 is provided with suitable operating mechanisms 14 and 15, respectively, capable of operating the switches from their closed position shown to open positions upon the reception of a trip signal. Series-connected diode 20 and isolating switch 21 are connected in parallel with main switch 10, and series-connected diode 23 and isolating switch 22 are connected in parall with switch 11. Diodes 20 and 23 can be single high power diodes, or can be formed of a plurality of series and/or parallel-connected diodes needed to obtain the required voltage and current requirements of the interrupter.

Switches 21 and 22 may be mechanically interlocked with switches 10 and 11, respectively, and can be operated by the common mechanisms 14 and 15, respectively, with switches 21 and 22 opening some given time delay after the operation of switches 10 and 11, respectively. The time delay is chosen such that switches 21 and 22 will open at or just before a current zero time.

Diodes 20 and 23, which are connected with opposing polarity, have a voltage rating substantially less than the recovery voltage of the circuit being protected. Thus, voltage division capacitors 30, 31 and 32 are provided as shown. To further help the response to transient recovery voltages, resistors 33, 34, and 35 may be connected in parallel with capacitors 30, 31 and 32, respectively. These resistors are preferably non-linear and will have an initial low resistance which increases by at least one order of magnitude as they absorb energy.

Two disconnect switches 37 and 38 may also be provided which open in about two cycles after the interrupter has operated in order to increase the BIL of the circuit breaker and to enable the reclosing of switches 10 and 11.

FIG. 1 schematically illustrates the operation control circuitry of the circuit of FIG. 1 as consisting of current transformer 40 having two secondary windings 41 and 42. Secondary winding 41 is connected to a current polarity detector circuit 43, and winding 42 is connected to circuit 44 which delivers a signal at some given time prior to a current zero. Each of circuits 43 and 44 produces outputs for operating mechanisms 14 and 15, as will be described. They become active upon an output signal from operating signal circuit 46 which can be a fault-responsive circuit and/or a manually operable circuit.

It is now possible to describe the operation of the circuit of FIG. 1. Assume that all switches are closed and that instantaneous current flow (conventional) is from terminal 12, through switches 10 and 11, to terminal 13. An operating signal from circuit 46 now activates circuits 43 and 44. Current polarity monitor determines that current flow is in the forward direction of diode 20 and, accordingly, operating mechanism 14 is activated to open switch 10 about 100 microseconds prior to current zero. The switch 10 can then open with almost no arcing, and forward current is commutated into diode 20, with only a few tenths of a volt needed for this commutation. Switch 10 is now open without substantial arcing, and diode 20 carries the line current for the 100 microseconds or so before current zero is reached. After current zero is reached, diode 20 is reverse-biased, and the circuit recovery voltage begins to build up across diode 20 and current flows into resistor 33 and capacitor 30. After the current has commutated into diode 20, and preferably at the instant of current zero, the isolating switch 21 is opened, and the recovery voltage now appears across switch 21 and diode 20, as divided by capacitors 30 and 31 and resistors 33 and 34. The circuit is thus interrupted without substantial arcing and with relatively uncritical timing for the opening of switches 10 and 21. In practice, the switch 21 may open a few microseconds before current zero.

Two cycles after the interruption, disconnect switches 37 and 38 may be opened and switches 10 and 21 may be reclosed.

The same operation as that described above proceeds for switch 11 and diode 23 if, at the time interruption is required, the current polarity is such that conventional current flow is from terminal 13 to terminal 12.

Figure 2:
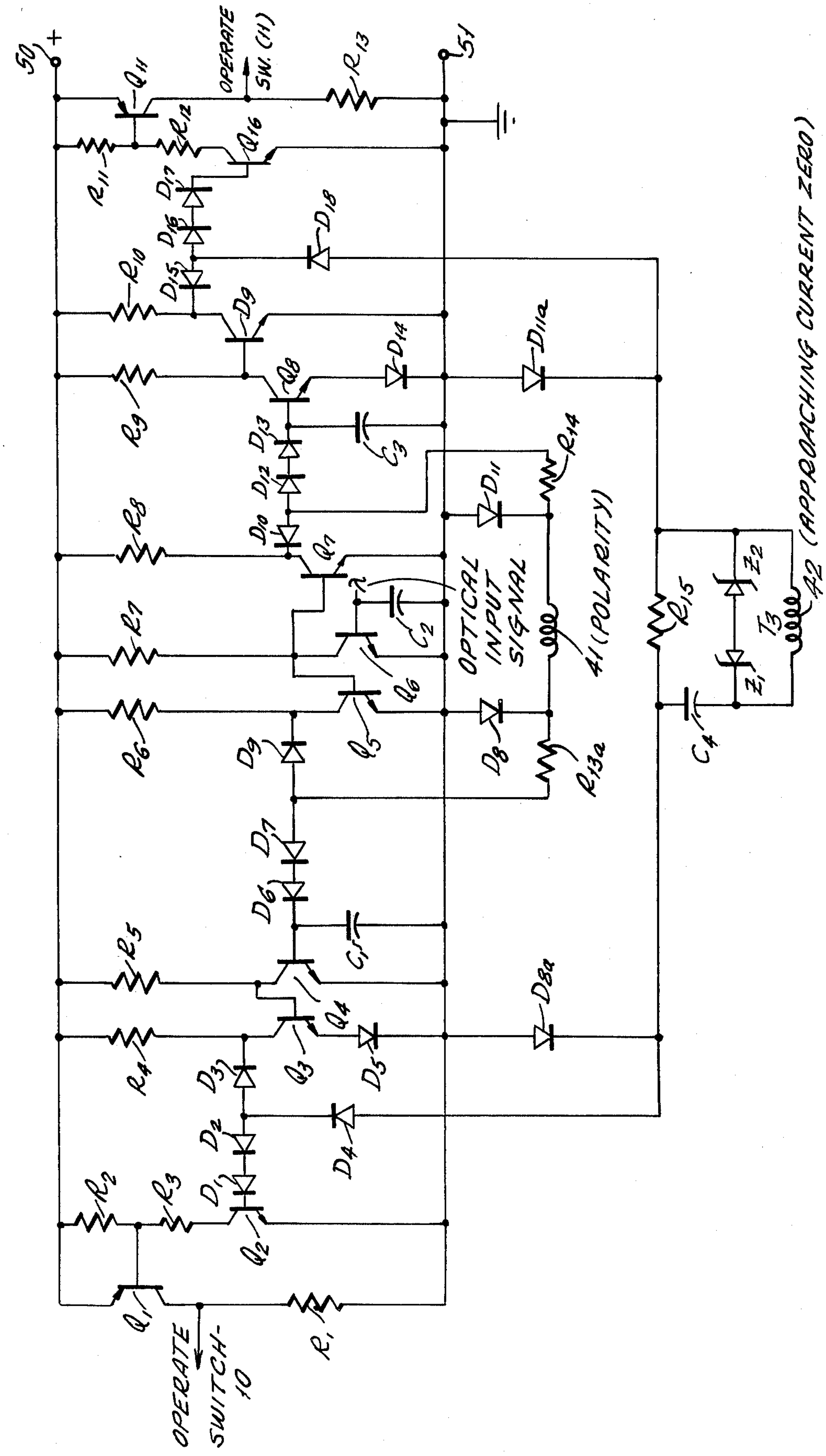
FIG. 2 is a circuit diagram of the circuit polarity and current zero approach monitor circuit which operates the switches of FIG. 1.

FIG. 2 shows a detailed circuit for controlling the operation of the system of FIG. 1 and which would serve the function of circuits 43 and 44 in FIG. 1.

In FIG. 2, there is provided a positive terminal 50 connected to a suitable power supply having a return or ground terminal 51. A number of parallel circuits are then connected across terminals 50 and 51. From left to right, these include, first, transistor $Q_1$ and a series resistor $R_1$. A terminal taken from the junction of $Q_1$ and $R_1$ will contain the signal needed to operate switch 10 of FIG. 1. A resistive divider $R_2$ and $R_3$ then provide the base current for transistor $Q_1$ and is connected in series with transistor $Q_2$. There is next a series resistor $R_4$ and transistor $Q_3$, and the base of transistor $Q_2$ is connected to diodes $D_1$ and $D_2$ while the base of transistor $Q_3$ is connected to diode $D_3$. A diode $D_4$ is connected to the junction of diodes $D_2$ and $D_3$, as will be later be described. A resistor $R_5$ is then connected in series with transistor $Q_4$ and diode $D_5$. The base of transistor $Q_4$ is connected to capacitor $C_1$ and diodes $D_6$, $D_7$. There is next a resistor $R_6$ in series with transistor $Q_5$. The collector of transistor $Q_5$ is connected to diode $D_9$.

A resistor $R_7$ is then connected in series with a phototransistor $Q_6$ which is suitably coupled to a light pipe (not shown) which delivers a tripping signal to the circuit breaker. The base of phototransistor $Q_6$ is connected to ground through capacitor $C_2$.

The circuit described to this point is the portion of the circuit which is responsible for delivering an operating signal to operate switch 10. An identical half is provided to operate switch 11, and this identical half includes transistors $Q_{11}$, $Q_{10}$, $Q_9$, $Q_8$ and $Q_7$ which correspond to transistors $Q_1$ to $Q_5$, respectively; resistors $R_{13}$, $R_{12}$, $R_{11}$, $R_{10}$, $R_9$ and $R_8$ which correspond to resistors $R_1$ to $R_6$, respectively; diodes $D_{17}$, $D_{16}$, $D_{15}$, $D_{14}$, $D_{13}$, $D_{12}$, $D_{11}$ and $D_{10}$ which correspond to diodes $D_1$ to $D_9$, respectively; and capacitor $C_3$ which corresponds to capacitor $C_1$.

The current transformer polarity monitoring winding 41 is then connected through resistors $R_{13a}$ and $R_{14}$ to the junctions of diodes $D_7$–$D_9$ and $D_{10}$–$D_{12}$ respectively, and to the return path formed by diodes $D_8$ and $D_{11}$. The zero current-sensing winding 42 is connected across zener diodes $Z_1$ and $Z_2$ and to the differentiating circuit comprised of capacitor $C_4$ and resistor $R_{15}$. The amount of current zero advance for operating switches 10 and 11 is set by the clipping level of zener diodes $Z_1$ and $Z_2$.

The operation of the sensor of FIG. 2 is as follows:

Assume that a fault is detected and a control signal is applied to the base of transistor $Q_6$ by an optical isolating link. Assume also that the polarity of the current flow in the circuit is such that switch 10 is to be opened. Transistor $Q_6$ is turned on, thereby turning off both transistors $Q_5$ and $Q_7$. The polarity signal from winding 41 is such that transistor $Q_4$ is turned on and, in turn, turns off transistor $Q_3$. Note that if the polarity signal were opposite, transistor $Q_8$ would have turned on, and $Q_9$ would have turned off.

The pulse from differentiator circuit $C_4$–$R_{15}$, which predicts a current zero, begins when the instantaneous current decreases below the clipping level of zener diode $Z_1$, and this pulse is applied to the base of transistor $Q_2$ to turn it on and, in turn, to turn on transistor $Q_1$. This then produces an output signal to operate operating mechanism 14, and thus to sequentially operate switch 10 and switch 21 as previously described.

Note that the transistor $Q_{11}$ would ultimately have turned on some given time prior to current zero if the polarity sensing winding 41 indicated that switch 11 should have been opened.

The above description showed the novel invention as applied to a-c circuit interruption. It will be apparent that the single circuit, using, for example, only diode 20, switch 10 and switch 21, along with a suitable operating circuit which would exclude polarity sensing could be used for d-c type circuit interruption.

Figure 3:
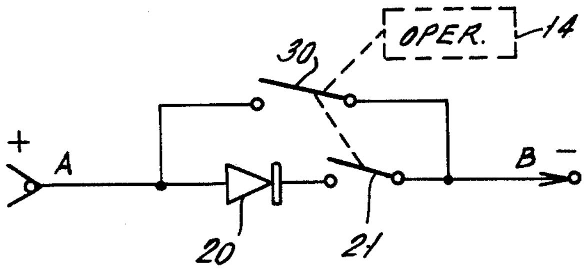
FIG. 3 shows the circuit of the invention for use in a d-c circuit.
Figure 4A:
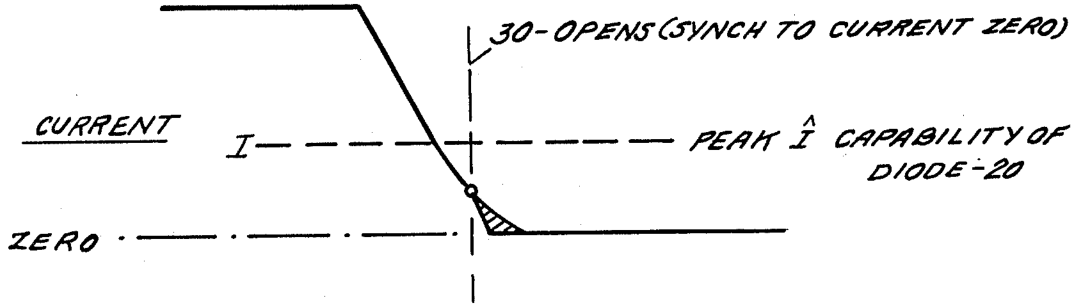
FIGS. 4*a* and 4*b* show current and voltage as a function of time for the circuit of FIG. 3.
Figure 4B:
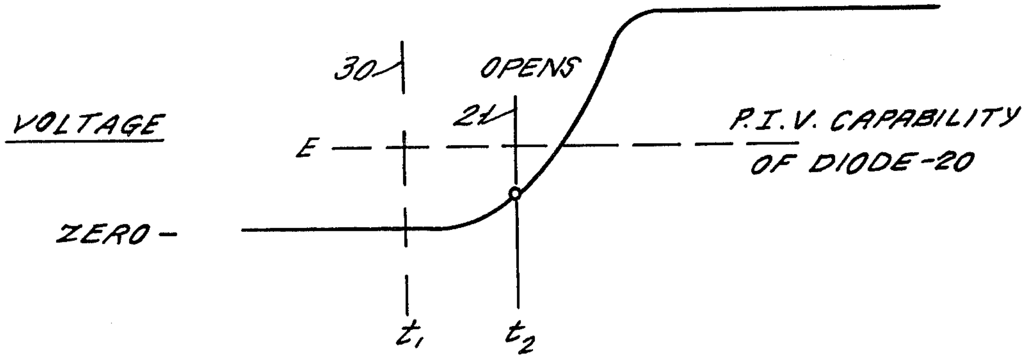

The basic concept of the invention can best be understood from FIGS. 3, 4*a* and 4*b* which show the circuit of the invention for application to a d-c type system. In FIG. 3, components similar to those of FIG. 1 are given the same identifying numerals. Thus, diode 20 is connected in series with switch 21, and the series combination is in parallel with switch 10. The operating mechanism 14 functions to open switch 10 at time t, in FIGS. 4*a* and 4*b*, and to open switch 21 at a later time $t_2$.

The operating mechanism opens switch 30 at some short time just prior to current zero as shown in FIG. 4*a*. Thus, the peak current which commutates into diode 20 will be less than the peak current capability I of the diode.

Once the diode current passes through zero, it cannot reverse, and reverse voltage begins to develop across the diode 20, as shown in FIG. 4*b*. However, switch 21 opens at time $t_2$ and before the reverse voltage on diode 20 reaches its peak inverse voltage capability. Thus, the diode 20 (on the group of devices which form diode 20) can be relatively small in comparison to the current and voltage ratings of the circuit being protected.

Although a preferred embodiment of this invention has been described, many variations and modifications will now be apparent to those skilled in the art, and it is therefore preferred that the instant invention be limited not by the specific disclosure herein but only by the appended claims.

I claim:

1. A minimum arcing a-c circuit interrupter comprising, in combination:

first and second high speed switches connected in series with one another;

a first diode and a first isolator switch connected in series with one another and in parallel with said first high speed switch;

a second diode and a second isolator switch connected in series with one another and in parallel with said second high speed switch;

said first and second diodes being connected in series, and with opposing polarities;

first operating means for said first and second high speed switches, respectively; said first operating means being operable to operate their respective switch to an open position at some first given time prior to a current zero;

second operating means for said first and second isolator switches for operating said isolator switches to an open position at some second given time after the commutation of current from one of said first or second high speed switches and into a respective one of said first or second diodes;

polarity monitoring means connected to said first and second operating means for operating only that one of said first or second high speed switches which carries current in the same direction as the forward conducting direction of its respective diode;

said first given time being about 100 microseconds prior to current zero;

said second given time being about current zero time;

disconnect switch means in series with said first and second high speed switches, said disconnect switch means opening after said interrupter has operated;

first and second voltage division capacitance means connected in parallel with each of said first and second diodes, respectively, and a third voltage division capacitance means connected in parallel with said first and second isolator switches and in series with said first and second voltage division capacitance means;

and first, second and third non-linear resistor means connected in parallel with said first, second and third voltage division capacitance means, respectively, and in series of each other.

* * * * *